US005647933A

United States Patent [19]

Christensen

[11] Patent Number: 5,647,933

[45] Date of Patent: Jul. 15, 1997

[54] FABRICATION METHOD FOR CORES OF STRUCTURAL SANDWICH MATERIALS INCLUDING STAR SHAPED CORE CELLS

[75] Inventor: Richard M. Christensen, Danville, Calif.

[73] Assignee: Regents of the University of California, Oakland, Calif.

[21] Appl. No.: 448,749

[22] Filed: May 24, 1995

Related U.S. Application Data

[63] Continuation-in-part of Ser. No. 264,261, Jun. 23, 1994, Pat. No. 5,437,903.

[51] Int. Cl.[6] .............................. B31D 3/02; B32B 31/00; B32B 31/04; B32B 31/16

[52] U.S. Cl. .......................... 156/197; 156/290; 156/292; 428/116

[58] Field of Search ................................ 428/72–73, 116, 428/118; 52/309.15; 156/197, 292, 291, 290

[56] References Cited

U.S. PATENT DOCUMENTS

| | | | |
|---|---|---|---|
| 3,164,507 | 1/1965 | Masuda | 156/197 |
| 3,227,600 | 1/1966 | Holland | 156/197 X |
| 3,366,525 | 1/1968 | Jackson | 156/197 |
| 3,501,367 | 3/1970 | Parker | 428/116 |
| 3,991,245 | 11/1976 | Jackson | 428/116 |
| 4,101,287 | 7/1978 | Sweed et al. | 264/56 X |
| 4,293,513 | 10/1981 | Langley et al. | 264/60 |
| 4,970,839 | 11/1990 | Lavi | 428/116 X |

*Primary Examiner*—Adrienne C. Johnstone

*Attorney, Agent, or Firm*—L. E. Carnahan; Henry P. Sartorio

[57] ABSTRACT

A method for fabricating structural sandwich materials having a core pattern which utilizes star and non-star shaped cells. The sheets of material are bonded together or a single folded sheet is used, and bonded or welded at specific locations, into a flat configuration, and are then mechanically pulled or expanded normal to the plane of the sheets which expand to form the cells. This method can be utilized to fabricate other geometric cell arrangements than the star/non-star shaped cells. Four sheets of material (either a pair of bonded sheets or a single folded sheet) are bonded so as to define an area therebetween, which forms the star shaped cell when expanded.

13 Claims, 3 Drawing Sheets

FABRICATION METHOD FOR CORES OF STRUCTURAL SANDWICH MATERIALS INCLUDING STAR SHAPED CORE CELLS

RELATED APPLICATION

This application is a continuation-in-part of U.S. application Ser. No. 08/264,261, files Jun. 23, 1994, entitled "Star Cell Type Core Configuration For Structural Sandwich Materials", now U.S. Pat. No. 5,437,903 issued Aug. 1, 1995, and assigned to the same assignee.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the fabrication of sandwich type structural materials, particularly to the fabrication of light weight core material of the sandwich type, and more particularly to a method for fabricating a core material pattern which utilizes star shaped cells.

Sandwich constructions involve a light weight core material that supports the faces and transfers load between them. The sandwich constructions generally utilize low density core materials. The elastic mechanical behavior for low density materials allows for deformation due to the flexibility of the core material when utilized in sandwich type constructions.

The traditional core material is of a triangular cell pattern, and more recently of a honeycomb (hexagonal) cell pattern. However, the triangular or hexagonal cell patterns of core materials do not easily conform to curved shapes needed to fabricate curved sandwich material panels. Thus, there has been a need for a core material which supports the faces of the sandwich construction materials on transfer loads between the faces, while being sufficiently flexible so as to conform easily to curved shapes. That need has been satisfied by the invention described and claimed in above-identified U.S. Pat. No. 5,437,903, which involves an improved microstructure for light weight core material utilizing a star/hexagonal pattern which allows easy conformation to curved shapes.

Various fabrication processes have been developed for the cellular sandwich structural materials, in an effort to produce these materials at a reasonable cost. For example, the prior honeycomb (hexagonal) material is fabricated by first vertically stacking a series of flat sheets with bonds located at the points of interconnection between the hexagonal cells, honeycomb configuration. The present invention, involving a method for fabricating an improved microstructure for light weight core material using the star containing pattern of the above-identified patent, utilizes features of the prior known processes by bonding or welding folded or unfolded sheets of material at selected locations to interconnect the sheets in both a vertical and a horizontal direction, and then mechanically pulling the interconnected sheets normal to the plane of the sheets which expands the sheets and form the star cells.

SUMMARY OF THE INVENTION

It is an object of the present invention to provide a fabrication method for an improved micro-structure for light weight core material of sandwich constructions.

A further object of the invention is to provide a method of fabricating a core material for structural sandwich constructions which utilizes star shaped cells.

Another object of the invention is to provide a fabrication method for a new pattern for microstructures which includes star shaped cells.

Anther object of the invention is to provide a method for fabricating sandwich type materials which utilizes star shaped cells, which involves bonding flat or folded sheets of material in both vertical and horizontal directions, to form a block of sheets, whereafter the sheets are mechanically pulled normal to the plane of the sheets causing expanding and formation of the cells.

Other objects and advantages of the invention will become apparent from the following description and accompanying drawings. The invention enables a simple and cost effective method to produce the star cell containing microstructure for cellular core material used in sandwich type structural materials. The fabrication method of this invention merely involves bonding folded or unfolded sheets of low density material in both vertical and horizontal directions to form a block which when mechanically pulled normal to the plane of the sheets expands to form interconnected star shaped cells. The fabrication method of this invention produces a cellular core material that is much more flexible than prior known core materials and can be conformed easily to curved shapes, thereby providing for the fabrication of curved sandwich panels.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The present invention involves a fabrication method for a microstructure pattern containing star shaped cells for cellular core material, such as described and claimed in above-referenced U.S. Pat. No. 5,437,903. The microstructure star containing pattern for the sandwich core material fabricated by the present invention is illustrated in FIG. 1.

Figure 1:
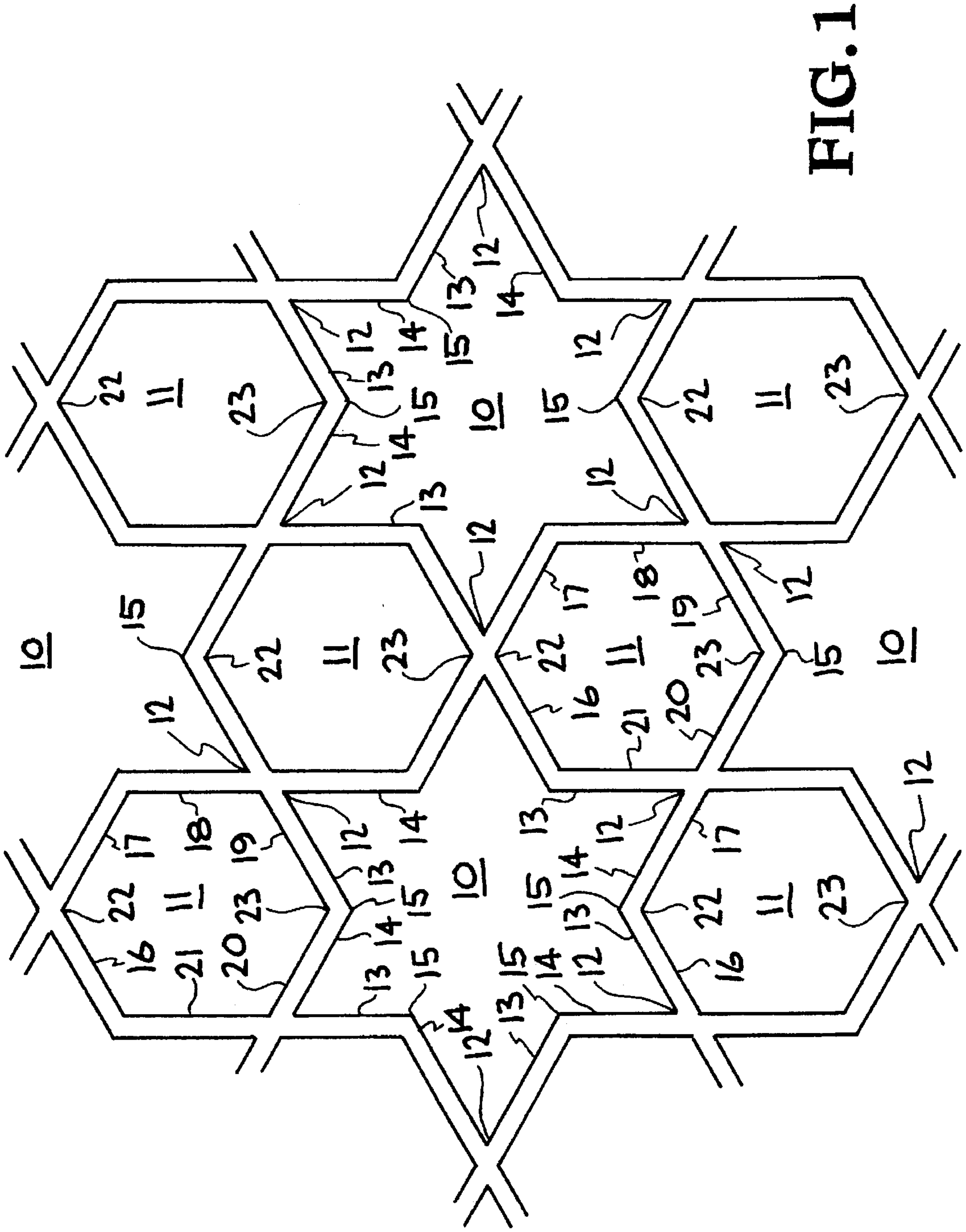
FIG. 1 illustrates a star/hexagonal cell configuration, for use such as in sandwich type structures.

As seen in FIG. 1, the microstructure pattern is composed of a combination of six pointed star shaped cells 10 and hexagonal shaped cells 11. The star shaped cell 10 include six points 12, with each point 12 formed by interconnect members 13 and 14 positioned at a 60° angle, with member 13 of one point and member 14 of an adjacent point 12 being interconnected at 15. The hexagonal cells 11 include six interconnected members or sides 16, 17, 18, 19, 20, and 21, with members or sides 16–17 and 19–20 forming points 22 and 23, with members or sides 17 and 20 forming flat surfaces between members 16–18 and 19–21. As seen in FIG. 1, either of points 22 or 23 of the hexagonal cells 11 is positioned against interconnects 15 between points 12 of star cells 10. Note that the length of the members 13 and 14 of star cells 10 are the same length as members or sides 16–21 of hexagonal cells 11. As seen in FIG. 1, each star cell 10 is surrounded by six (6) hexagonal cells 11, with two (2) hexagonal cells 10 positioned intermediate two adjacent star cells 10, and with each of the points 12 of a star cell 10 being in contact with a point 12 of an adjacent star cell 10. The microstructure composed of star shaped cells 10 and hexagonal shaped cells 11 is positioned intermediate a pair of panel faces or members which define a sandwich type structure panel as conventionally known in the art. The number of cells within the sandwich panel will vary depending on the width of the panel and the desired density of the core material.

By way of example, with a sandwich panel having a thickness of ½ inch, the length of the members 13 and 14 forming the points 12 of the star cell 10 and the length of the members or sides 16–21 of the hexagonal cell 11 is ¼ inch, and may be constructed of any material such as metals, ceramics, polymers, glasses, natural products, etc.

Referring now to the fabrication method for producing the star cell containing microstructure of FIG. 1, reference is made to FIGS. 2 and 3, wherein sheets (flat or folded) of low density material are bonded, welded, or otherwise secured together, defined hereinafter as bonding, in both vertical and horizontal directions to form a block. The thickness of the bond or weld sections are greatly exaggerated for illustration purposes. Basically, the sheets of material, either flat (FIG. 2) or folded (FIG. 3) are bonded together to form a block, only part of which as shown, whereafter the block of sheets is expanded to form a light weight star containing configuration similar to that of FIG. 1.

Figure 2:
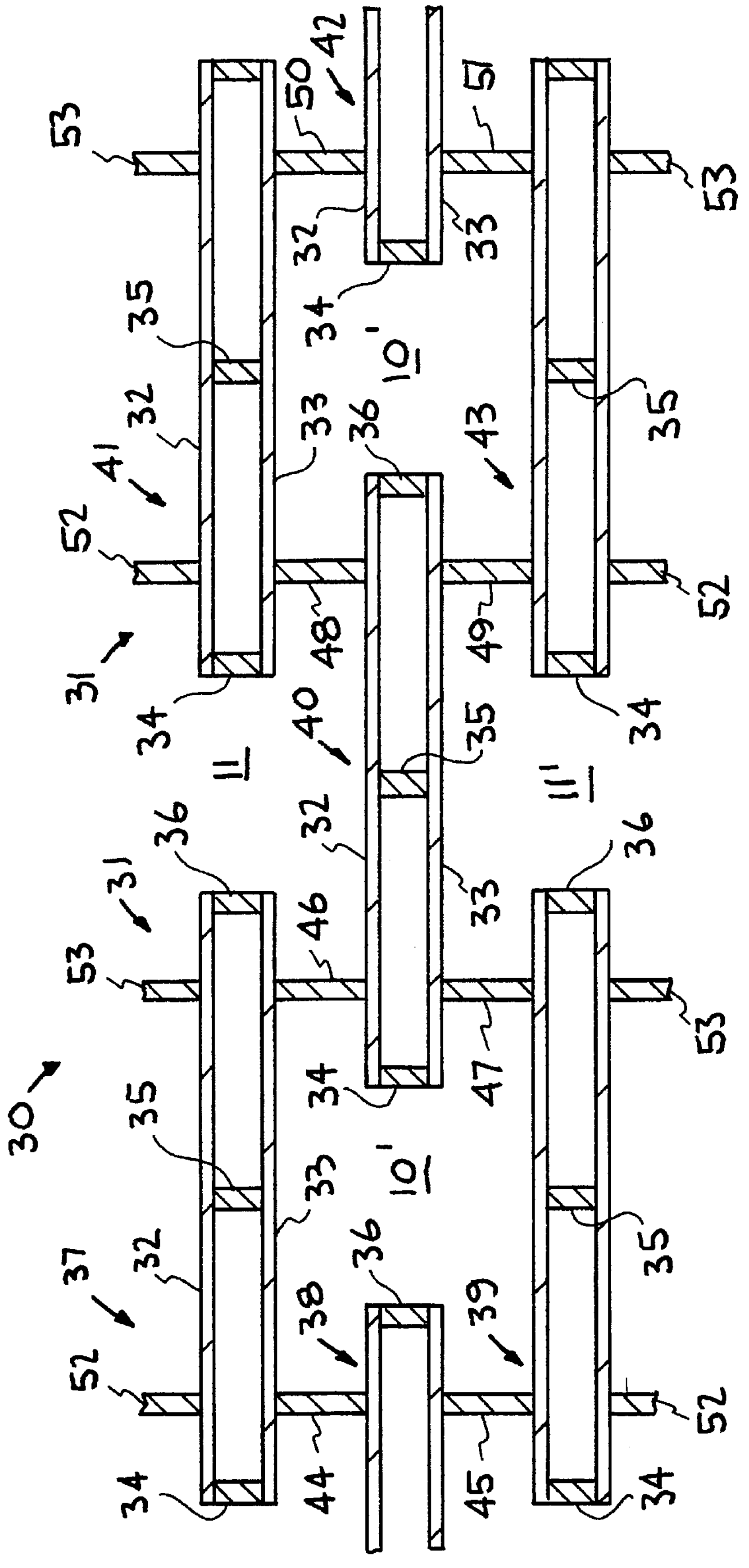
FIG. 2 is an enlarged partial cross-sectional view of a block of bonded or welded flat sheets of low density material in accordance with the fabrication method of this invention.

Referring first to FIG. 2, a partial block 30 is composed of pairs of sheets generally indicated at 31 of material constructed of aluminum, for example, with each sheet having a thickness of 0.01 mm to 10 mm, the pairs of sheets are bonded together in both a vertical and a horizontal direction. As shown, the pairs of sheets 31 are composed of vertically aligned flat sheets 32 and 33 bonded together, such as by polymeric adhesives, at each end and in the center thereof as indicated at 34, 35, 36, and are referred to hereinafter as sheet pairs. The thus bonded sheet pairs are indicated at 37, 38, 39, 40, 41, 42, and 43. The location of the center bond 35 of each sheet pair determine the length of the side members of the star shaped structure, such as members 13–14 of star cell 10. The sheet pairs 37 and 39 are bonded at 44 and 45 to sheet pair 38 and at 46 and 47 to sheet pair 40; while sheet pairs 41 and 43 are bonded at 48 and 49 to sheet pair 40 and at 50 and 51 to sheet pair 42. As indicated by bonds 52 and 53, sheet pairs 37 and 39 are bonded to adjacent sheet pairs similar to 38 and 40 not shown, but after which sheet pairs similar to sheet pairs 37 and 39 are bonded, such that the block 30 contains a series of repeated spaced sheet pairs 37–39 and 41–43, pairs 38, 40, and 42 positioned therebetween. The location of the bonds 44–51 of the adjacent pairs of sheet pairs also determines the length of the side members of star cells 10 of FIG. 1.

The block 30 as illustrated in FIG. 2 is then subjected to a mechanical pull to expand the sheet pairs with respect to one another. The sheet pairs are mechanically pulled normal to the plane of the sheets 32 and 33, which expands the sheet pairs to form the star shaped cells and interconnecting cells. This can be envisioned by pulling sheet pairs 37 and 41 and sheet pairs 39 and 43, while simultaneously pulling sheet pairs 38, 40, and 42 with corresponding sheet pairs, not shown, in opposite directions. Thus when sheet pairs 37 and 39 and sheet pairs 41 and 43 are mechanically pulled with respect to each other, the area intermediate the sheet pairs 37 and 39 or sheet pairs 41 and 43 form a pattern similar to a star shaped cell indicated at 10'; and the areas on each side of sheet pair 40 form positions of interconnecting cells indicated at 11'. The interconnecting cells 11' formed by pulling the sheets of block 30 are not hexagonal in shape. Although the appearance of the cells thus formed appear different from the explicit star pattern of FIG. 1, the thus formed microstructure will still possess the advantages of the star/hexagonal structure of FIG. 1, because the layout or block 30 of FIG. 2 conforms to the star template. Following the mechanical pulling the thus formed microstructure is bonded intermediate a pair of panel faces of members, not shown.

Figure 3:
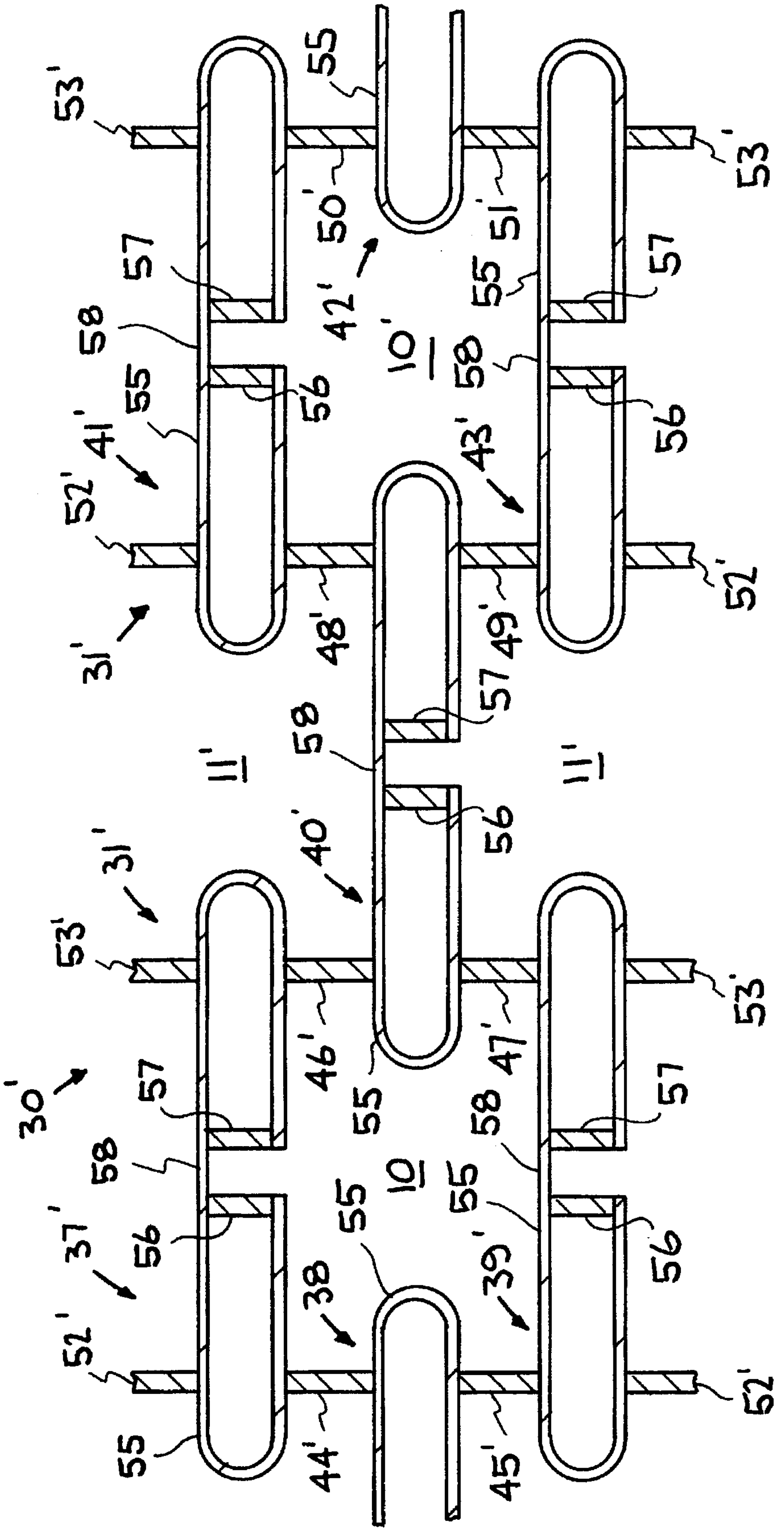
FIG. 3 is an enlarged partial cross-sectional view similar to FIG. 2 except the sheets of low density material are folded and bonded together to form a block, as in the FIG. 2 fabrication method.

The fabrication method illustrated by FIG. 3 differs from that illustrated by FIG. 2 in utilizing a single folded sheet in place of the two flat sheets 32 and 33 for each of the sheet pairs 37–42 of FIG. 2 and the replacement of the end and center bonds 34, 35, and 36 of each sheet pair with two end bonds. As seen in FIG. 3 a partial block 30' is composed of pairs of sheets generally indicated at 31' of low density material constructed of aluminum and thickness of 0.01 mm to 10 mm, for example, with the pairs of sheets 31' each composed of a single folded sheet 55 with ends thereof bonded at 56 and 57 to a central section 58 of the folded sheet 55, and referred to hereinafter as sheet pairs. The bonds 56 and 57 may be composed of aluminum and produced by polymeric adhesives for example. The thus bonded sheet pairs are indicated at 37', 38', 39', 40', 41', 42', and 43'. As in the method illustrated by FIG. 2, the sheet pairs 37' and 39' are bonded at 44' and 45' to sheet pair 38' and at 46' and 47' to sheet pair 40'; while sheet pairs 41' and 43' are bonded at 48' and 49' to sheet pairs 40' and at 50' and 51' to sheet pair 42'. As indicated by bonds 52' and 53' sheet pairs 37', 39', 41' and 43' may be bonded to adjacent sheet pairs sheet pairs 38', 40', and 42' interposed therebetween, as described above. As pointed out above, the location of the end bonds 56 and 57 and bonds 44–51 determine the length of the side members of the star cell and the interconnecting cells, such as the hexagonal cells of FIG. 1. As set forth above with respect to the method illustrated by FIG. 2, the block 30' of FIG. 3, which when mechanically pulled normal to the plane of the sheets, expands to form star shaped cells 10' and interconnecting cells 11'. After expansion, the microstructure is bonded intermediate a pair of panel faces or members not shown to define a sandwich structure.

It has thus been shown that the present invention provides a method for fabricating structural sandwich material utilizing star shaped cells. This method is carried out using either flat sheets or folded sheets bonded to form a star configuration when mechanically expanded, and thereafter positioned between panels or members to form a completed sandwich type structural material. Although the appearance of the cell forms could look quite different from the explicit six-point star pattern, the material will still possess the advantages of this configuration because the manufacturing layout conforms to the star pattern.

While particular sequences of operations, materials, parameters, and structural configurations, etc., have been set forth to exemplify and explain the principles of the invention, such are not intended to be limiting. Modifications and changes may become apparent to those skilled in the art, and it is intended that the invention be limited only by the scope of the appended claims.

What is claimed is:

1. A method for fabricating a core for a sandwich structure comprising providing a microstructure for the core composed of cells including star shaped cells surrounded by hexagonal shaped cells.

2. The method of claim 1, wherein the star shaped cells halve six points thereon.

3. The method of claim 1, wherein the star shaped cells are in point contact with at least another star shaped cell.

4. The method of claim 1, wherein six hexagonal shaped cells are in contact with each star shaped cell.

5. The method of claim 1, wherein the core is formed by bonding a plurality of sheets of material in a pattern, and expanding the thus bonded sheets of material to form the star shaped cells surrounded by hexagonal shaped cells.

6. A method for fabricating a core for a sandwich structure comprising forming a microstructure for the core including star shaped cells, the core being formed by bonding a plurality of sheets of material in a pattern, and expanding the thus bonded sheets of material to form the star shaped cells, and wherein the bonding of the plurality of sheets of material in a pattern is carried out by a technique selected from the groups consisting of forming each of the plurality of sheets of material from a pair of sheets of material and bonding the pair of sheets of material together to form a plurality of sheet pairs, and forming each of the plurality of sheets of material from a single folded sheet of material and bonding ends of the single folded sheet to a central section thereof to form a plurality of sheet pairs.

7. The method of claim 5, additionally including forming each of the plurality of sheets of material from a single folded sheet of material, and bonding ends of the single folded sheet to a central section thereof to form a plurality of sheet pairs.

8. The method of claim 5, additionally including constructing the plurality of sheets of material to define a sheet pair composed of at least portions of two sheets of material, and bonding a plurality of thus formed sheet pairs in both vertical and horizontal directions to form a block of bonded sheet pairs.

9. The method of claim 8, additionally including bonding at least one pair of sheet pairs to ends sections of another pair of spaced sheet pairs to form an area defined by said two pairs of sheet pairs, and expanding the thus bonded sheet pairs whereby the area defined thereby has a star shaped configuration.

10. A method for fabricating a core for a sandwich structure comprising forming a microstructure for the core composed of cells including star shaped cells, the core being formed by bonding a plurality of sheets of material at a pattern, and expanding the thus bonded sheets of material to form the star shaped cells, wherein the bonding of the plurality of sheets of material in a pattern is carried out by constructing the plurality of sheets of material to define a sheet pair composed of at least portions of two sheets of material, and bonding a plurality of the thus formed sheet pairs in both vertical and horizontal directions to form a block of bonded sheet pairs, and wherein the construction of the bonded sheet pairs is carried out by a technique selected from the group consisting of forming each sheet pair from a pair of flat sheets bonded together on at least the outer ends thereof, and forming each sheet pair from a single folded sheet with each end of the folded sheet being bonded to a central section of the folded sheet.

11. The method of claim 10 wherein said pair of flat sheets are also bonded together on at least one location intermediate the ends thereof.

12. The method of claim 8, additionally including forming each sheet pair from a single folded sheet, each end of said folded sheet being bonded to a central section of said folded sheet.

13. The method of claim 12, wherein said ends of said folded sheet are in a spaced relation to each other.

* * * * *